United States Patent
Wang et al.

(10) Patent No.: US 6,914,722 B2
(45) Date of Patent: Jul. 5, 2005

(54) FIBER OPTICAL CIRCULATOR

(75) Inventors: Li Wang, San Jose, CA (US); Jerry Lee, Saratoga, CA (US); QiKiao Chen, Fremont, CA (US); Tim Wang, San Jose, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 196 days.

(21) Appl. No.: 10/096,380

(22) Filed: Mar. 12, 2002

(65) Prior Publication Data

US 2002/0171934 A1 Nov. 21, 2002

Related U.S. Application Data

(60) Provisional application No. 60/292,015, filed on May 19, 2001.

(51) Int. Cl.⁷ ............................. G02B 27/28; G02B 6/27
(52) U.S. Cl. .......................... 359/497; 359/494; 385/11
(58) Field of Search ...................... 359/484, 494–497, 359/499; 385/11

(56) References Cited

U.S. PATENT DOCUMENTS 5,909,310 A * 6/1999 Li et al. ...................... 359/484
6,301,045 B1 * 10/2001 Liu ............................. 359/484

FOREIGN PATENT DOCUMENTS

JP            05323233 A    * 12/1993     ........... G02B/27/28

\* cited by examiner

*Primary Examiner*—Akm Enayet Ullah
*Assistant Examiner*—Omar Rojas
(74) *Attorney, Agent, or Firm*—Silicon Valley Patent Agency

(57) ABSTRACT

A fiber optical circulator includes a first collimator and a second collimator sandwiching a circulator core therebetween. The first collimator and the second collimator respectively define Port 1 and Port 2 thereof, and the first collimator further defines Port 3 thereof. The circulator core includes a first crystal and a second crystal at two ends respectively confronting the first collimator and the second collimator aside. The circulator core further includes a first group of two half-wavelength waveplates and a first Faraday rotator, and second subassembly a second group of two half-wavelength waveplates and a second Faraday rotator. A third crystal is disposed between the first subassembly and the second subassembly wherein a backward light path from Port 2 to Port 3 passes the third crystal and is deflected by the third crystal toward the first collimator though total internal reflection.

19 Claims, 3 Drawing Sheets

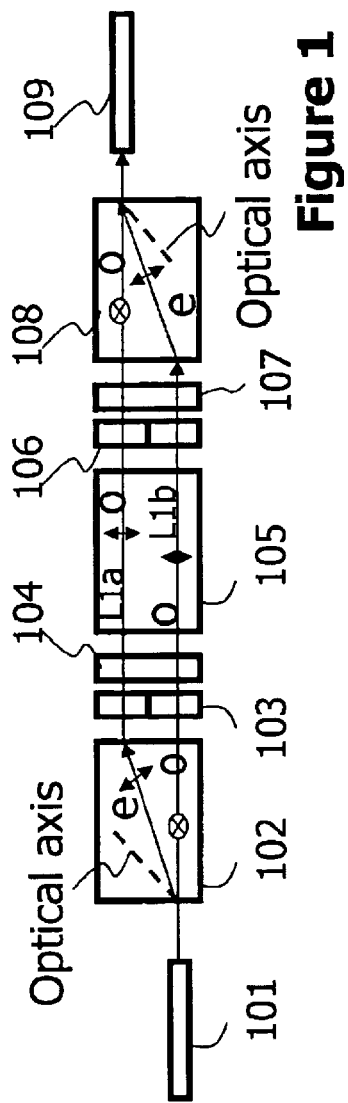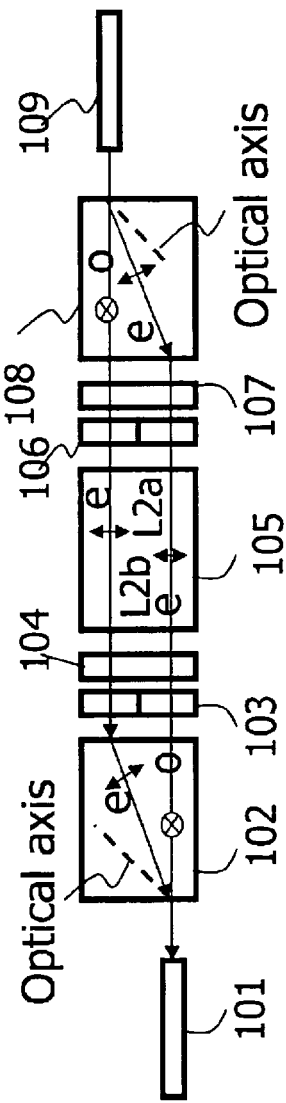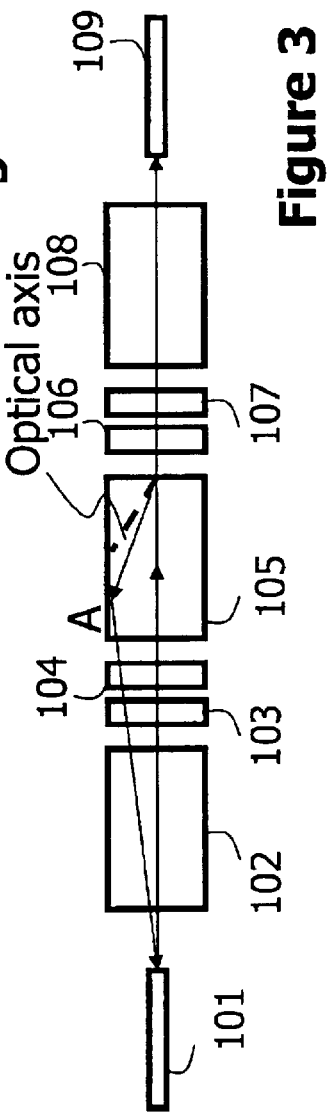
Figure 1
Figure 2
Figure 3

Port 1 => Port 2

Port 2 => Port 3

FIBER OPTICAL CIRCULATOR

This non-provisional application claims benefit of the provisional application of No. 60/292,015 filed May 19, 2001

BACKGROUND OF THE INVENTION

1. Field of the Invention

The invention relates to fiber optical circulators, and particularly to the circulator with a simplified structure thereof.

2. The Related Art

An optical circulator is a passive, non-reciprocal device that is widely used in fiber optical communication systems and subsystems such as bi-directional transmission systems and optical add/drop multiplexers. A circulator should have at least three-ports, where the light entering from Port 1 goes to Port 2 while the light entering from Port 2 goes to Port 3. To meeting the ever-demanding requirements of higher performance, better reliability, easier fabrication and lower cost, people have been seeking simpler and more miniaturized designs.

Most of the traditional optical circulator designs normally have a collimator device such as a GRIN lens (Graded index lenses) to couple light into or from the fiber of each port. For a three-port circulator, three collimating lenses would have to be used in those designs. As a result, the traditional circulators are often very bulky and expensive since the price goes up quickly as the sizes of crystals increase. At the same time, the alignment and reliability can be troublesome if there are many optical elements used in the circulators.

As the optical communication technology becomes more mature and more widely deployed, the need to shrink the optical circulator size and to decrease the cost must be met. Several designs have been proposed to make the linear shaped circulators which consist of only two collimating lenses to enable smaller package sizes. In those designs, Port 1 and Port 3 share the same one collimating lens with each other. To do this, the forward light (from Port 1 to Port 2) must leave the collimator of Port 1 and 3 with a different beam angle from that of the backward light (from Port 2 to Port 3) which enters the same collimator. To create the angle difference, several mechanisms were proposed in the prior arts. Generally, those techniques were either difficult to realize since many elements are requisitely involved to create this angle difference, and/or the solutions were too expensive. U.S. Pat. Nos. 4,272,159, 4,650,289, 5,204,771, 5,400,418, 5,471,340, 5,574,596, 5,682,446, 5,689,593, 5,818,981, 5,909,310, 5,923,472, 6,002,512, 6,014,475, 6,026,202, 6,052,228, 6,075,596, 6,088,491, 6,111,695 and 6,178,044, show some approaches.

Therefore, an object of the invention is to provide a circulator with a simplified structure, thus resulting in robustness, good performance and the low cost thereof.

SUMMARY OF THE INVENTION

According to an aspect of the invention, a fiber optical circulator includes a first collimator and a second collimator sandwiching a circulator core therebetween. The first collimator and the second collimator respectively define Port 1 and Port 2 thereof, and the first collimator further defines Port 3 thereof. The circulator core includes a first crystal and a second crystal at two ends respectively confronting the first collimator and the second collimator aside. The circulator core further includes first subassembly confronting the first crystal and having first group of two half-wavelength waveplates and first Faraday rotator, and second subassembly confronting the second crystal and having second group of two half-wavelength waveplates and second Faraday rotator. A third crystal is disposed between the first subassembly and the second assembly. The light (L1) enters from Port 1, successively passes the first crystal, the first subassembly, the third crystal, the second subassembly, the second crystal, and leaves from Port 2 along one path, while the light (L2) enter from Port 2, successively passes the second crystal, the second subassembly, the third crystal, the first subassembly, the first crystal, and leaves from Port 3 along another path, wherein the third crystal not only plays a role as a well known walk-off crystal to separate the optical paths depending on the light polarization states, but also serves as the angle difference generating mechanism through the total internal reflection for differentiation of the backward and forward light paths.

BRIEF DESCRIPTION OF THE DRAWINGS

FIG. 1 is a side view of the preferred embodiment of the circulator according to the invention showing the path of the forward light L1.

FIG. 2 is a side view of the circulator of FIG. 1 showing the path of the backward light L2.

FIG. 3 is a top view of the circulator of FIG. 1 showing the paths of both the forward and backward lights L1 and L2.

DETAILED DESCRIPTION OF THE PREFERRED EMBODIMENTS

Figure 4:
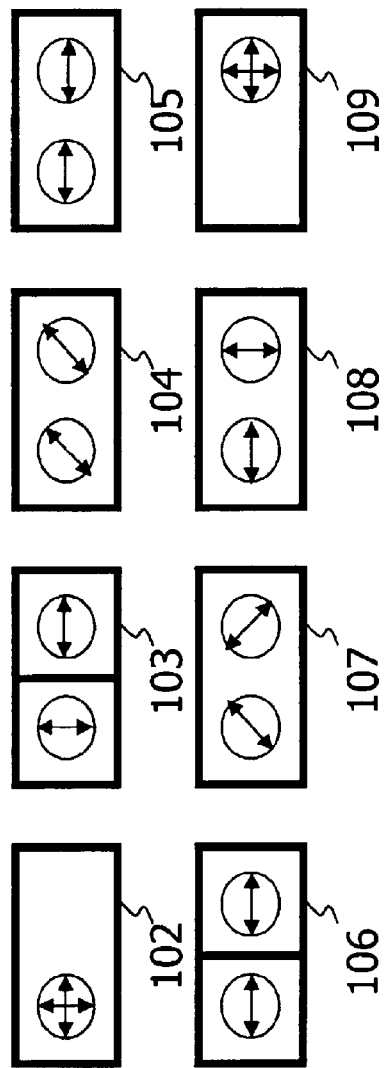
FIG. 4 is a diagram showing the polarization before passing the corresponding components for the forward light L1, from a viewpoint of Port 2.
Figure 5:
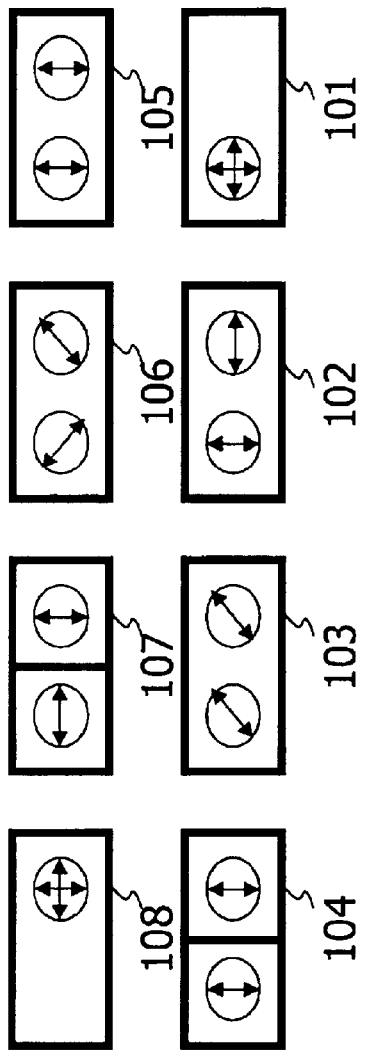
FIG. 5 is a diagram showing the polarization before passing the corresponding components for the backward light L2, from a viewpoint of Port 2.

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components are designated by like reference numerals throughout the various figures in the embodiments. Attention is directed to FIGS. 1–6 wherein the circulator includes a first collimating rod lens 101 defining thereof Port 1 and Port 3 with fibers coupled thereto and an opposite second collimating rod lens 109 defining thereof Port 2 with a fiber coupled thereto. A circulator core is disposed between the first collimating rod lens 101 and the second collimating rod lens 109. The circulator core includes a first walk-off (birefringent) crystal 102 confronting the first collimating rod lens 101, and a second walk-off (birefringent) crystal 108 confronting the second collimating rod lens 109. The circulator core further includes a first subassembly confronting the first crystal 102 and having a first group of two half-wavelength waveplates 103 and a first Faraday rotator 104, and a second subassembly confronting the second crystal 108 and having a second group of two half-wavelength waveplates 106 and a second Faraday rotator 107. A third walk-off (birefringent) crystal 105 is disposed between the first subassembly and the second subassembly. FIGS. 1–3 show the optical axes of the first, second and third crystals 102, 108 and 105 used in this embodiment wherein the optical axes of the crystals 102 and 108 extend in the plane defined by the side view paper while the optical axis of the third crystal 105 extends in a plane perpendicular to the side view paper. The crystals 102 and 108 have the same sizes and optical axis directions For the forward light L1 with an arbitrary polarization state from Port 1 to Port 2, the light L1 leaves the first collimating rod lens 101 and successively enters the first crystal 102 where it separates into an extraordinary ray (e ray) L1a whose polarization direction is lying in the plane defined by the optical axis of the first crystal 102 and the light propagation direction, i.e., lying on the side view paper, and an ordinary ray (o ray) L1b whose polarization direction is perpendicular to the aforementioned plane defined by the optical axis of the first crystal 102 and the light propagation direction, i.e., being perpendicular to the side view paper.

It is noted that the following description regarding rotation angle is from a viewpoint of the propagation direction of the light. Thus, the light L1a enters one of the first group of two half-wavelength waveplates 103 and experiences a 45 degrees polarization rotation clockwise, and successively enters the first Faraday rotator 104 and experiences a 45 degrees polarization rotation anti-clockwise (counterclockwise). For the light L1a, the net polarization rotation after the first rotator 104 is zero, so the polarization direction of the light L1a is not changed and still in the plane defined by the side view paper.

On the other hand, the light L1b enters the other of the second group of two half-wavelength waveplates 103 and experiences a 45 degrees polarization rotation anti-clockwise, and further enter the first rotator 104 and experiences another 45 degrees polarization rotation anti-clockwise. Therefore, there is a net 90 degrees polarization rotation/change for the light L1b after leaving the rotator 104, thus resulting in the accumulative polarization direction lying on the side view paper as well as the light L1a.

As mentioned before, the optical axis of the third crystal 105 is in the plane that is perpendicular to the side view paper, so that both polarization directions of the lights L1a and L1b entering the third crystal 105 are perpendicular to the optical axis of the third crystal 105, being o rays thereof. As a result, both the lights L1a and L1b follow the Snell's law and propagates through the third crystal 105.

Afterwards, the light L1a enters one of the second group of two half-wavelength waveplates 106 and experiences a 45 degrees polarization rotation anti-clockwise, and then successively experiences another 45 degrees polarization rotation anti-clockwise in the second Faraday 107. Therefore, after passing the second Faraday 107, for the light L1a accumulatively the polarization direction turns to be perpendicular to the plane define by the side view paper and becomes an o ray to the second crystal 108, and accordingly goes straight through the second crystal 108.

On the other hand, the light L1b experiences a 45 degrees polarization rotation clockwise in the other of the second group of two half-wavelength waveplates 106 and a 45 degrees polarization rotation anti-clockwise in the second Faraday rotator 107. Thus, there is no net polarization direction change for the light L1b, and thus its accumulative polarization direction is still lying in the plane defined by the side view page, thus being an e ray to the second crystal 108. As an e ray, the light L1b does not go straight while being instead combined with the light L1 a as a single beam to enter the second collimating rod lens 109 and propagate to the fiber of Port 2.

Differently, the backward light L2 with an arbitrary polarization state from Port 2 to Port 3 and leaving the collimating rod lens 109, enters the second crystal 108 where it is separated into an extraordinary ray (e ray) L2a whose polarization direction is along the optical axis of the second crystal 108 and thus in the plane defined by the side view paper, and an ordinary ray (o ray) L2b whose polarization direction is perpendicular to the optical axis of the second crystal 108, i.e., being perpendicular to the side view paper.

The light L2a enters the second Faraday rotator 107, experiencing a 45 degrees polarization rotation clockwise, and then enters the second half-wavelength waveplate of 106, experiencing another 45 degrees polarization rotation clockwise. Therefore, there is a net 90 degrees polarization rotation for the light L2a after leaving one of the second group of two half-wavelength waveplates 106 and before entering the third crystal 105. Thus, the accumulative polarization direction of the light L2a is perpendicular to the plane defined by the side view paper. Because the optical axis of the third crystal 105 is in the plane that is perpendicular to the plane of the side view paper, the light L2a is an e ray thereto.

On the other hand, the light L2b enters the second Faraday rotator 107 experiencing a 45 degrees polarization rotation clockwise, and then enters the other of the second group of two half-wavelength waveplates 106, experiencing a 45 degrees polarization rotation anti-clockwise. Thus, there is not net polarization rotation for the light L2b after leaving the second half-wavelength waveplate 106, and the polarization direction of the light L2b is still perpendicular to the plane defined by the side view paper. Because the optical axis of the third crystal 105 is in the plane that is perpendicular to the plane of the side view paper, the light L2b is also an e ray thereto as well as the light L2a.

Referring to FIG. 3, because both the lights L2a and L2b are e rays to the third crystal 105, resulting in deflection relative to the light propagation direction (i.e., the longitudinal axis of the circulator) toward the side surface A, which is oblique relative to the longitudinal axis of the circulator in this embodiment, in comparison with the lights L1a, L1b being o rays to the third crystal 105 without such deflection. Because the surface A is polished and the incident angle of L2a/L2b to the surface A is large enough, a total internal reflection occurs for L2a/L2b. Understandably, the surface A may optionally be coated with reflection layer or the reflection is through an external device. Via this reflection, the directions of the light L2a and L2b are no longer parallel to the longitudinal axis of the circulator after the lights L2a and L2b leave the third crystal 105.

Afterwards, the lights L2a and L2b go through the first Faraday rotator 104, both experiencing a 45 degrees polarization rotation clockwise. Then through the first group of two half-wavelength waveplates 103, respectively, another 45 degrees polarization rotation clockwise is added to the light L2b, while a 45 degrees polarization rotation anti-clockwise is added to the light L2a. As a result, the light L2a becomes an o ray to the first crystal 102 while the light L2b becomes an e ray to the first crystal 102 according to the optical axis of the first crystal 102 and the polarization direction changes of both the lights L2a and L2b via the first Faraday rotator 104 and the first crystal 103. Therefore, the lights L2a and L2b rejoin with each other after leaving the first crystal 102 and enter the first collimating rod lens 101 with an angle relative to the longitudinal axis of the circular core. Understandably, this angle is determined by the total internal reflection of the lights L2a and L2b on the surface A.

One feature of the invention is that the third crystal 105 not only plays a role as a walk-off crystal to separate the optical paths depending on the light polarization states, but also serves as the angle difference generating mechanism through the total internal reflection for differentiation of the backward and forward light paths. In other words, in the invention a new technology is proposed to create the angle difference for differentiation of the backward and the forward light paths wherein the birefringent crystal 105 is arranged in a way that the light which is linearly polarized in a certain direction and propagating in one direction experiences total internal reflection while the light which is linearly polarized in another direction perpendicular to the previous light and propagating in an opposite direction experiences refraction only.

Because only one crystal is required for both walk-off purpose and the angle difference control. This simplifies the circulator design, alignment and assembling issues.

It is noted that in this embodiment an oblique cut on the third crystal 105 may be not necessary to implement this invention. The key point is to have the lights L2a and L2b may hit the side surface of the third crystal 105 to create a internal reflection before they leave the third crystal 105. In other words, the ratio of the dimension of the third crystal 105 along the longitudinal direction and that along a lateral/radial direction should not be smaller than a minimum value for assuring such a total internal reflection within the third crystal 105 for the beam with a finite width. As to the oblique of the surface, it is to help controlling the beam angle after the light L2a/L2b leaves the third crystal 105 and subsequently affect the beam incident angle when it enters the first collimating rod lens 101.

Figure 6:
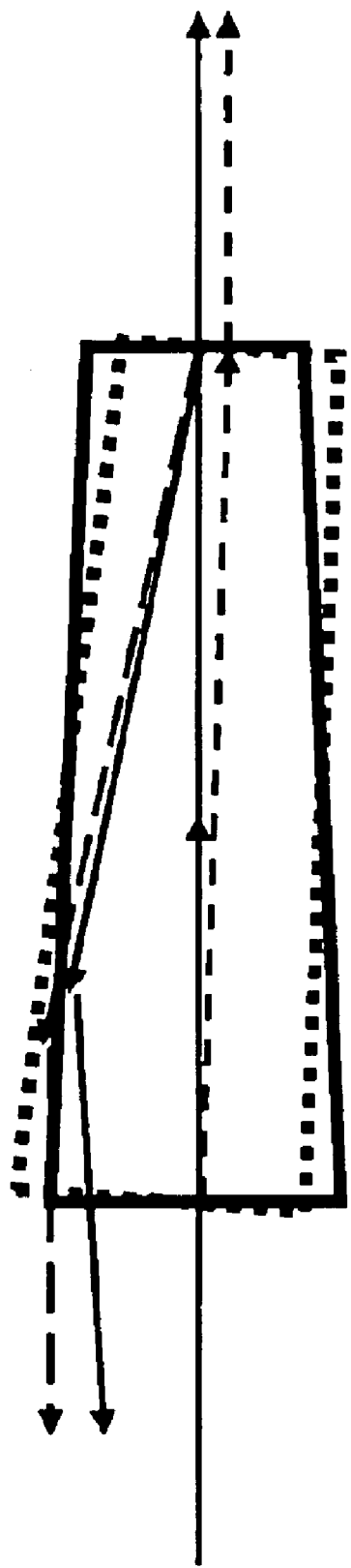
FIG. 6 shows the tilting of the third crystal for changing the beam angle of the backward light to ease tolerance of alignment while still maintaining the beam angle of the forward light.

Another important feature/advantage is that referring to FIG. 6, the angle changer crystal 105 is utilized by adjustably tilting/rotating the crystal 105 to finely/easily tune the relative radial/axial positions among the components whereby the angle of the backward light L2 can be varied in a well controlled manner, while the forward light L1 only experiences a small shift laterally from the forward light path without changing its beam angle (the dotted lines showing the situation after tilting of the third crystal 105. In other words, while the deflection angle for the light L1 (including L1a and L1b) is also controlled by tilting/rotating of the third crystal 105, the output angle of the light L1 is still the same since the tilting only creates a small transverse displacement and the direction of the light L1 leaving the third crystal 105 is still parallel to the direction of the light L1 before entering the third crystal 105. Thus, when one is adjusting the light path in one direction, the propagating direction of the light in another direction is almost totally independent, i.e., the angle of the backward light L2 being able to be adjusted independently from the angle of the forward light L1. This can greatly relieve the mechanical tolerance requirements, achieve the more robust designs, and make the alignment much easier.

The optical circulator of the invention as described in the embodiment may enjoy the benefits offered by the three-port circulators with only two imaging devices, including low component count, small size and low cost. Additionally, other advantages include easy alignment, polarization independent, low polarization mode dispersion (PMD), low polarization dependent loss (PDL) and other good optical performances.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims. For example, it is possible to design circulators with other walk-off configurations using the angle changing mechanism implied in the invention. There are also other Faraday rotator and waveplate combinations which change the polarization states differently, including sequences and rotation angles, from the presently preferred embodiment to realize the circulator functionalities under the principle implied in the invention. Moreover, in this embodiment, only one light path, i.e., L2, experiences the total internal reflection. Anyhow, if necessary under some other conditions, having both opposite light paths deflected with total internal reflection may be another alternative even though it is more difficult to arrange than the current embodiment.

Therefore, person of ordinary skill in this field are to understand that all such equivalent structures are to be included in the scope of the following claims.

We claim:

1. An optical circulator comprising:
  a first collimator and a second collimator opposite to said first collimator;
    said first collimator defining a first port, said second collimator defining a second port, said first collimator further defining a third port;
  a circulator core disposed between said first collimator and said second collimator,
    said circulator core including first and second birefringent crystals respectively confronting the first collimator and the second collimator, said circulator core further including first and second subassemblies between the first crystal and the second crystal and respectively confronting the first crystal and the second crystal with a third crystal sandwiched therebetween; and
  a forward light path being defined from the first port to the second port, and a backward light path being defined from the second port to the third port and different from the forward path; wherein
    at least one of said forward light path and said backward light path experiences total internal reflection in the third crystal; wherein
    said one of the forward light path and the backward light path is the backward light path; wherein
    the other of said forward light path and the backward light path only refracts in the third crystal.

2. The circulator as described in claim 1, wherein said third crystal is provided with a reflection surface.

3. The circulator as described in claim 2, wherein said reflection surface is one exterior surface of said third crystal.

4. The circulator as described in claim 3, wherein said reflection surface is the surface not intersecting a longitudinal axis of the circulator while with a space in a lateral/radial direction of the circulator.

5. The circulator as described in claim 4, wherein said third crystal defines dimensions with a minimum ratio along said longitudinal axis and said lateral/radial direction for assuring reflection occurring thereof.

6. The circulator as described in claim 2, wherein said reflection surface is oblique to a longitudinal axis of the circulator.

7. The circulator as described in claim 6, wherein the oblique reflection surface is adjustably tilted to comply with the position/alignment of one of said the first collimator and said second collimator.

8. The circulator as described in claim 7, wherein the oblique reflection surface is adjustably tilted to comply with the first collimator.

9. The circulator as described in claim 1, wherein said first subassembly includes a first Faraday rotator and a first group of two half-wavelength waveplates.

10. The circulator as described in claim 1, wherein said second subassembly includes a second Faraday rotator and a second group of two half-wavelength waveplates.

11. The circulator as described in claim 1, wherein all the first, second and third crystals are birefringent crystals.

12. A method of differentiating paths for backward and forward light paths in an optical component, comprising the steps of:
   providing a first collimator and a second collimator opposite to each other;
      providing said first collimator with a first port and said second collimator with a second port;
      further providing the first collimator with a third port;
      defining a forward light path from the first port to the second port and a backward light path from the second port to the third port;
      disposing first birefringent crystal (102), first subassembly (103, 104), second subassembly (106, 107) and second birefringent crystal (108) between said first collimator and said second collimator in sequence; and
      providing a third crystal between said first subassembly and said second subassembly with a reflection surface; wherein
      at least one of said forward light path and said backward light path is only reflected by said reflection surface in said third crystal.

13. The method as described in claim 12, wherein said one of the forward light path and the backward light path is directed to the first collimator after reflection.

14. An optical circulator comprising:
   a first collimator and a second collimator opposite to said first collimator,
      said first collimator defining a first port, said second collimator defining a second port, said first collimator further defining a third port;
      a circulator core disposed between said first collimator and said second collimator,
      said circulator core including first and second crystals respectively confronting the first collimator and the second collimator, a third crystal positioned therebetween to perform reflection thereof; and
      a forward light path being defined from the first port to the second port, and a backward light path being defined from the second port to the third port and different from the forward path; wherein
      the backward light path is reflected toward the first collimator by said reflection surface when said backward light path passes the third crystal, and an incident angle of the backward light path relative to the first collimator is determined by said reflection surface; wherein
      a Faraday rotator and a half-wavelength waveplate are positioned between said first crystal and said third crystal which the backward light path passes.

15. The circulator as described in claim 14, wherein said reflection. surface is oblique to a longitudinal axis of the circulator to comply with said incident angle.

16. An optical circulator comprising:
   a first collimator and a second collimator opposite to said first collimator;
      said first collimator defining a first port, said second collimator defining a second port, said first collimator further defining a third port;
      a circulator core disposed between said first collimator and said second collimator,
      said circulator core including first and second birefringent crystals respectively confronting the first collimator and the second collimator, a third crystal positioned therebetween; and
      a forward light path being defined from the first port to the second port, and a backward light path being defined from the second port to the third port and different from the forward path; wherein
      the forward light path goes straight in one direction in the third crystal while the backward light path includes only two successive sections pointing to different directions, respectively, in the third crystal.

17. The circulator as described in claim 16, wherein said two successive sections result from an internal reflection occurring in the third crystal.

18. An optical circulator assembly comprising:
   a first collimator and a second collimator opposite to said first collimator;
      said first collimator defining a first port, said second collimator defining a second port, said first collimator further defining a third port;
      a circulator core disposed between said first collimator and said second collimator,
      said circulator core including first and second birefringent crystals respectively confronting the first collimator and the second collimator, a third crystal positioned therebetween; and
      a forward light path being defined from the first port to the second port, and a backward light path being defined from the second port to the third port and different from the forward path; wherein
      the backward light path leaving from the third crystal has been reflected once and directed toward an imaginary center axis of the whole assembly rather than away from said center axis, and thus no fourth crystal is provided between the third crystal and the first collimator for inwardly deflecting light.

19. The assembly as described in claim 18, wherein said third crystal performs a function of initially outward deflecting and successively inwardly deflecting light.

* * * * *